Patented May 24, 1949

2,470,751

UNITED STATES PATENT OFFICE 2,470,751

METHOD OF PREPARING GUM-CONTAINING SEEDS FOR DEHUSKING

Bernard Chiego, Newark, N. J.

No Drawing. Original application June 16, 1944, Serial No. 540,745. Divided and this application February 12, 1949, Serial No. 76,199

4 Claims. (Cl. 146—235)

This invention relates to the problem of treating certain types of seeds or beans in a new and improved manner whereby a gum, used in the food and textile industries, may be obtained. This application is a division of application Serial No. 540,745 filed June 16, 1944.

The gum obtained from the endosperms of the seeds of the carob tree (Ceratonia siliqua) and the seeds of Delonix regia (Poinciana regia Hook) is a valuable commodity of commerce. Both of the seeds mentioned possess seeds coats or husks which are very difficult to remove, and various methods have heretofore been employed therefor. Among the methods that have been used is the employment of concentrated sulfuric acid, 90–95% at a temperature of from 40° C. to 70° C. I have found that this method is slow and wasteful because the carbonizing process cannot be so controlled as to completely eliminate destructive action on portions of the endosperm. The seeds mentioned have an extremely hard husk or coat within which are carried the two symmetrical semi-transparent bodies, the endosperm, and within these are carried the embryo which includes cotyledons. When treating carob beans by the concentrated sulfuric acid method, the husk or tegument is injured or partially destroyed, along with portions of the endosperm which contains the gum.

It is therefore the principal object of my invention to treat these beans so that the husk may be readily removed without the use of concentrated sulfuric acid.

Another object of my invention is the removal of such husk in a manner so as to obtain the endosperm and cotyledons comprising part of the embryo both in an entirely and substantially unaltered state.

Further objects will occur to others skilled in this art from what follows.

In carrying out my improved process, I preferably treat the seeds in a vapor or liquid at super-atmospheric pressures and temperatures in the presence of an agent to control the swelling of the endosperms. Among such agents I may employ acids such as sulfurous acid, alcohols (methyl or ethyl or propyl or isopropyl alcohol), acid salts such as the acid sulfates or sulfites of the alkalies. In addition water soluble glycol ethers such as ethylene glycol mono alkyl ether or diethylene glycol mono alkyl ethers may be employed. I have found that perfect control of the swelling of the endosperms can be obtained by adding 5–15% of the alcohols or glycols to the water. In the case of the salts or acids much lower concentrations 1–2%) may be employed.

To accomplish my result, I may employ dilute solutions of acid salts preferably reducing acid salts for example, sodium bisulfite in low concentrations at super-atmospheric pressures and temperatures.

Thus, in treating the seed from Ceratonia siliqua, I employ a 1 or 2% solution of sodium bisulfite or sodium bisulfate in water. To this the beans are added and treated in a pressure vessel for from 5–30 minutes at 20–100 lbs. gauge steam pressure. The autoclave pressure is blown off and the beans are removed and washed in cold water, whereupon the hulls will be found to be easily removed from the endosperms which are in a slightly swollen but ungelatinized state. On passing these through squeeze-rollers or other suitable means, the cotyledons comprising parts of the embryo are pressed out entire from the endosperms and are recoverable. They have good food value. The endosperms are obtained by this method in an undiscolored, undegenerated whole state. On drying, they can be powdered to yield a superior product for commerce.

In treating the seeds of the Delonix regia, I prefer to treat them at the same concentrations of acid salts or acid reducing salts but at slightly higher steam pressures because this seed has a double coat or hull. This is proven by the fact that when the seeds of Delonix regia are treated simply with steam at 20–100 lbs. pressure and a time interval of 1–8 minutes, the outer of the two hulls will be found to exfoliate from the inner hull which remains intact.

However, on treating these seeds with the above mentioned solutions at from 40–100 lbs. steam pressure and a time interval of from 2–8 minutes, the hulls are so altered as to make their removal easy by known methods. Again, the endosperm and inner cotyledons will be found to be substantially undiscolored, slightly swollen but ungelatinized and undegenerated.

In order to thoroughly explain my method of treatment, I cite the following examples of the steps which may be employed to prepare the pure gum by my method:

1. 100 lbs. of seeds of Ceratonia siliqua are placed in a pressure autoclave. They are covered with a solution of 1 or 2% sodium bisulfite or sodium bisulfate or 5–15% of alcohols or water soluble glycol ethers. Heat is applied or steam is admitted for twenty minutes and the pressure maintained at 40 lbs. The pressure having been blown off, the seeds are washed in a suitable apparatus with cold water to remove the seed coats and then passed through squeeze-rollers to extrude the inner yellowish cotyledons. The endosperms are separated, dried and powdered.

2. 100 lbs. of seeds of *Delonix regia* are placed in a pressure auto clave and treated as above except at a higher pressure and temperature, viz. 20–30 minutes at 50–60 lbs. pressure. For the preparation of the finished product, one may proceed substantially as above.

I have found that the methods which I have used as heretofore explained are faster than any others of which I am aware, and easier to manipulate, cheaper to install and operate, and yield a superior product.

It is, of course, apparent that the concentration of agents for the control of the state of hydration of the endosperms as well as the time and pressure used in treatment may be altered considerably and over a wide range without departing from the scope of my invention. Thus, when the steam pressure is increased, the time of treatment may be decreased. Also when the concentration of agents for the control of hydration of the endosperm is increased, the time and pressure may be altered.

My process makes possible not only easier and cheaper treatment, but prepares the beans for dehusking in a manner that makes the complete removal of the inner cotyledons simple and efficient.

What I claim is:

1. The method of preparing *Ceratonia siliqua* (carob) and *Delonix regia* seeds for dehusking which comprises treating the seeds over a relatively short period of time ranging substantially from five to thirty minutes at super-atmospheric pressure and temperature at steam gauge pressure ranging from 20 to 100 lbs., in a solution of water and a substance selected from the group consisting of (1) water soluble alcohols in approximately 5–15% concentration, (2) water soluble mono glycol ethers in approximately 5–15% concentration which will soften the coats of said seeds while at the same time perfectly controlling the state of hydration of the endosperms.

2. The process of treating seeds having a tough outer coating or husk difficult of removal such as the seeds from the carob tree and the *Delonix regia*, to get their endosperms containing gum valuable in industry, which consists in treating the seeds in a solution of water and a water soluble alcohol in approximately 5–15% concentration in a pressure vessel under a steam gauge pressure ranging from 20 to 100 lbs. for a time ranging from five to thirty minutes, then taking off the pressure, washing the seeds and removing the husks, then removing the cotyledons and other parts of the embryo from the endosperms.

3. The process of treating seeds having a tough outer coating or husk difficult of removal such as the seeds from the carob tree and the *Delonix regia*, to get their endosperms containing gum valuable in industry, which consists in treating the seeds in a solution of water and a water soluble mono glycol ether in approximately 5–15% concentration is a pressure vessel under a steam gauge pressure ranging from 20 to 100 lbs. for a time ranging from five to thirty minutes, then taking off the pressure, washing the seeds and removing the husks, then removing the cotyledons and other parts of the embryo from the endosperms.

4. The process of treating *Delonix regia* seeds to get their endosperms, which consists in treating the seeds for an interval of time varying from 2–8 minutes at a steam guage pressure of from 40 to 100 lbs. in a solution of water and a substance selected from the group consisting of (1) water soluble alcohols in approximately 5–15% concentration, (2) water soluble glycol ethers in approximately 5–15% concentration, then taking off the pressure washing the seeds in water that is preferably cold and removing the husks, then removing the cotyledons and other parts of the embryo from the endosperms.

BERNARD CHIEGO.

REFERENCES CITED

The following references are of record in the file of this patent:

UNITED STATES PATENTS

| Number | Name | Date |
|---|---|---|
| Re. 8,615 | Fisher | Mar. 11, 1879 |
| 117,271 | Fitts | July 25, 1871 |
| 531,377 | Hanson | Dec. 25, 1894 |
| 566,497 | Castle | Aug. 25, 1896 |
| 580,401 | Hopkins | Apr. 13, 1897 |
| 641,934 | Castle | Jan. 23, 1900 |
| 853,940 | Zimmerman | May 14, 1907 |
| 1,051,582 | Heinemann | Jan. 28, 1913 |
| 1,087,684 | Reynolds | Feb. 17, 1914 |
| 1,433,928 | Baxter | Oct. 31, 1922 |
| 1,849,786 | Bloede | Mar. 15, 1932 |
| 1,987,304 | Menke | Jan. 8, 1935 |
| 2,007,693 | Ruter | July 9, 1935 |
| 2,059,787 | Gow | Nov. 3, 1936 |
| 2,128,175 | Baer | Aug. 23, 1938 |
| 2,326,868 | Lantz et al. | Aug. 17, 1943 |